United States Patent
Maroy et al.

(10) Patent No.: US 6,586,371 B1
(45) Date of Patent: Jul. 1, 2003

(54) LIQUID COMPOSITIONS WHICH REVERSIBLY VISCOSIFY OR GEL UNDER THE EFFECT OF SHEAR

(75) Inventors: Pierre Maroy, Buc (FR); Francoise Lafuma, Sceaux (FR); Coralie Simonet, Le Havre (FR)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 09/601,127

(22) PCT Filed: Jan. 20, 1999

(86) PCT No.: PCT/EP99/00327

§ 371 (c)(1),
(2), (4) Date: Oct. 19, 2000

(87) PCT Pub. No.: WO99/38931

PCT Pub. Date: Aug. 5, 1999

(30) Foreign Application Priority Data

Feb. 2, 1998 (FR) .............................................. 98 01130

(51) Int. Cl.$^7$ ................................................. C09K 7/02
(52) U.S. Cl. ...................... 507/120; 507/140; 507/119; 507/121; 507/122; 507/123; 507/224; 507/225; 507/226; 507/227; 507/228; 507/229; 507/269

(58) Field of Search ................................. 507/140, 119, 507/120, 121, 122, 123, 224, 225, 226, 227, 228, 229, 269

(56) References Cited

U.S. PATENT DOCUMENTS

| | | | | |
|---|---|---|---|---|
| 4,888,120 A | * | 12/1989 | Mueller et al. | 507/140 |
| 5,637,635 A | * | 6/1997 | Patel | 524/400 |
| 5,728,652 A | * | 3/1998 | Dobson, Jr. et al. | 507/140 |
| 5,728,654 A | * | 3/1998 | Dobson, Jr. et al. | 507/140 |
| 6,103,671 A | * | 8/2000 | Dobson et al. | 507/140 |

* cited by examiner

Primary Examiner—Philip Tucker
(74) Attorney, Agent, or Firm—Stephen Schlather; Catherine Menes; Brigitte Jeffery

(57) ABSTRACT

The present invention provides a water-based fluid, in particular for drilling, completion or for any other intervention in a well such as a hydrocarbon well, in which the viscosity is controlled by a system constituted by precipitated silica nanoparticles (A) associated with a water-soluble copolymer (B) comprising one or more water-soluble co-monomers (I) having little or no affinity for silica and one or more co-monomers (II) which absorb onto the silica. The invention is of particular application to the secondary recovery of hydrocarbons.

21 Claims, 1 Drawing Sheet

LIQUID COMPOSITIONS WHICH REVERSIBLY VISCOSIFY OR GEL UNDER THE EFFECT OF SHEAR

The present invention relates to drilling and completion techniques for hydrocarbon, geothermal, and analogous wells, and to stimulation techniques, or more generally to reservoir rock engineering techniques aimed at optimizing recovery of fluids contained in those reservoirs.

In the hydrocarbon well industry, a number of water-soluble polymers with gelling or viscosifying properties are used. The most frequently used polymers, such as vegetable gums, endow the solution with non-Newtonian properties with low viscosity at high shear rates and high viscosity at rest (a rheo-fluidifying fluid). For numerous applications, the opposite behaviour (rheo-viscosifying) is desirable.

Thus one known method for secondary recovery of hydrocarbons consists of injecting a flushing fluid—such as water to which polymers have been added to increase its viscosity—to displace the hydrocarbons towards the production well. A fluid in which the viscosity increases reversibly with shear forces could minimise viscous fingering problems and could render the flushing front uniform by preventing pockets of non flushed hydrocarbons from forming.

Rheo-viscosifying compositions can be formed by associating colloidal particles with polymers. The scientific publications listed below concern an association of a nano-silica (in precipitated form) with a poly(ethylene oxide) type homopolymer with a molecular mass in the range 4,000,000 to 5,000,000 g/mol.

- Shear Induced Gelation Of Colloidal Dispersions. B. Cabane, K. Wong, P. Lindner, F. Lafuma in Journal of Rheology 41(3), May/June 1997
- Rheological Behavior Of Moderately Concentrated Silica Suspensions In The Presence Of Absorbed Poly (Ethylene Oxide) S. F. Liu, F. Lafuma, R. Audebert in Colloid. Polym. Sci. 272, p 196–203, 1994
- General Phase And Rheoloyical Behavior Of Silica/PEO/Water Systems S. F. Liu, V. Legrand, M. Gourmand, F. Lafuma, R. Audebert in Colloids and Surfaces 111, p 139–145, 1996.

With such systems, viscosification under shear is reversible, but such associations are quite fragile and very sensitive to the ionic strength of the medium and to the presence of surfactants, which destroy the rheo-viscosifying properties. High molecular weight poly(oxy)ethylenes are very expensive and they are manufactured in small quantities only, which is not favourable for industrial applications.

In *Adsorption Of Polyacrylamide On Silica Particles And Its Effect On The Rheological Properties Of Suspension*, Y. Otsubo and K. Umeya observed gelling phenomena in Aerosil silica/polyacrylamide systems (in a glycerine/water medium). Gelling in that case was irreversible above a critical shear rate. When the shear rate was reduced, the viscosity stayed at the level reached at a high shear rate and the behaviour thus became rheo-fluidifying.

There is thus a need for a fluid with reversible rheo-viscosifying properties which can be effectively exploited on an industrial scale.

The present invention provides a water-based fluid, primarily for drilling, completion, or any other intervention in a well such as a hydrocarbon well, in which the viscosity is controlled by a system constituted by precipitated silica nanoparticles (A) associated with a water-soluble copolymer (B) comprising one or more monomers (I) having little or no affinity for the silica and one or more co-monomers (II) which adsorb onto the silica.

The term "silica nanoparticles" means particles with a diameter of less than 70 nanometers, preferably less than 40 nanometers and more preferably less than 10 nanometers.

The water-soluble copolymers of the invention must have a molecular mass of more than 700,000 g/mol, preferably more than 1,000,000 g/mol and more preferably more than 2,000,000 g/mol. The type (II) co-monomers must be in the minority and must be well dispersed in the copolymer which thus comprises at least 50%, and preferably at least 70%, of type (I) co-monomers, with a blocky statistical distribution, i.e., with a large number of very short sequences.

Examples of type (I) co-monomers are acrylamide, acrylic acid, methacrylic acid or any other acrylic acid derivatives substituted with an alkyl group in the β position, AMPS (2-acrylamido-2-methylpropanesulphonate), or sulphonated styrene. Acrylamide is preferred because of its moderate price, the readiness with which it produces high molecular masses, and its low interaction with the silica surface.

Type (II) co-monomers carry functions which are capable of adsorbing onto the silica and thus contain one or more heteroatoms which are well provided with available electron pair(s). Examples are vinylpyrrolidone, vinylimidazole (pH>6), vinylpyridine, alkylvinylethers, N-vinylacetamide, and hydroxyethylmethacrylate and alkyl derivatives of these compounds. Two (or more) type (II) co-monomers with very different affinities for the silica surface can be incorporated into the copolymer so as to vary the effects on the rheology of the solution when shear is applied to that solution.

Figure 1:
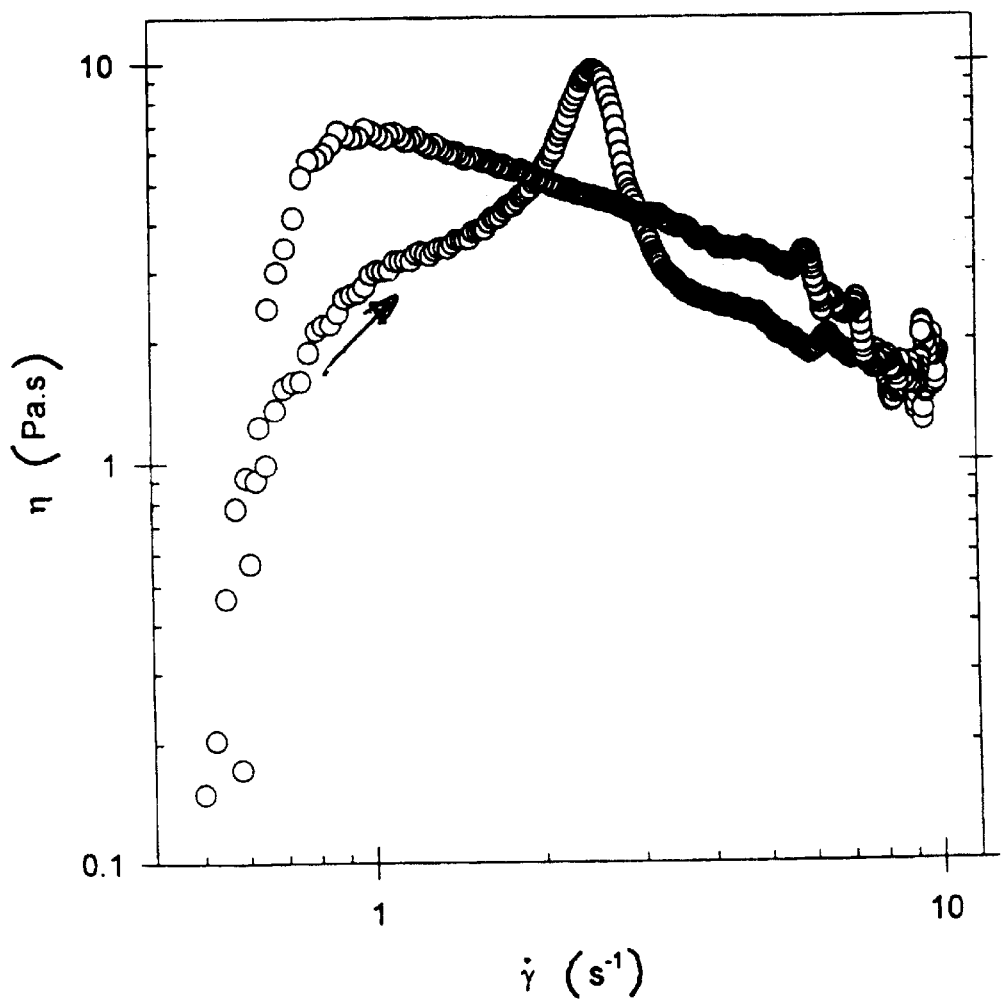
FIG. 1 shows the static rate flushing test of Example 17.

Preferred copolymers are of type PAA/PVI (polyacrylamide/polyvinylimidazole) or PAA/PVP (polyacrylamide/polyvinylpyrrolidone):

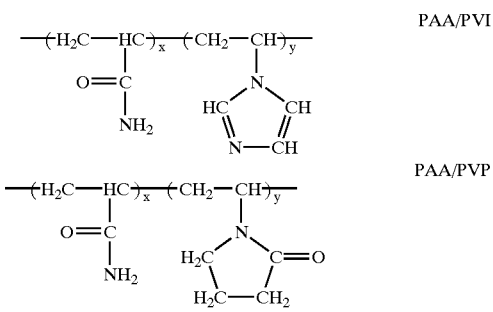

where y=1−x and x is in the range 0.05 to 0.2.

The concentration of copolymer in the water-based fluid of the invention is generally of the order of 0.5 g/l to 10 g/l and normally does not exceed 5%. The precipitated silica is added in a quantity such that the number of grams of copolymer per square meter of silica surface is in the range 0.1 mg/m² to 2 mg/m², preferably in the range 0.2 mg/m² to 1.5 mg/m². Knowing the specific surface area of the silica, for example in m²/g, and the concentration of the silica in the solution, for example in g/l, enables the surface area of silica per unit volume of solution to be obtained in m²/l and enables it to be related to the concentration of polymer in the solution.

For a given quantity Q of polymer added per unit surface area of silica, the quantity of polymer, and thus of silica, determines the degree of increase of viscosity (which can result in gelling) for a given shear rate at a given time, and also the minimum shear rate—also known as the critical shear rate—needed to obtain this effect.

It should be pointed out that the viscosity increase (or gelling) of aqueous solutions containing the copolymer/silica system of the invention is reversible, i.e., when the shear rate is reduced, the viscosity reduces. Depending on the composition, certain gelling fluids of this composition exhibit a hysteresis effect, i.e., once gelling occurs, a much lower shear rate is sufficient to maintain the gelling effect for a particular period. Further reduction of the shear rate subsequently leads to liquefaction of the fluid.

In a variation, a third additive (C), known as the competing agent, is added to the aqueous solution. This additive (C) must adsorb onto the silica surface, either in a manner which is stronger than the adsorbable co-monomer(s), or in a manner which is substantially equal or slightly weaker. In the first case, the aim is to reduce the available silica surface for adsorption of the copolymer by blocking a portion of the adsorption sites of the silica surface and by spreading out these sites. In the second case, the competing agent reduces the intensity of adsorption of the copolymer by reversible competition for the silica adsorption sites. It should be noted that the interpretations of the mechanisms proposed here are given purely by way of indication and must not be considered to limit the invention.

A comparison of the force of the adsorption is made by comparing the adsorption isotherms of the copolymers and the competing agents. The presence of a competing agent is not indispensable in the present invention, but can reduce the range of the ratio Q for which reversible rheo-viscosification/gelling is sought. It also means that type (II) co-monomers with a strong interaction with the silica can be used at copolymer concentrations at which they would form permanent gels, or to render rheo-viscosifying those compositions which would be rheo-gelling, or again to pass from the rheo-fluidification zone to the rheo-viscosification zone.

It may be advantageous to use not just one but a mixture of a plurality of competing agents with different affinities for the silica surface to vary the effects on the rheology of the solution during application of shear to the solution. The quantity of competing agent is generally less than 50 g/l, and ordinarily does not exceed 2.5 g/l.

Particularly suitable products for use as a competing agent (C) are:
  Non ionic surfactants (in particular alkylphenylethyleneglycol) and co-surfactants (for example butanol with fatty alcohols);
  poly(ethylene oxide)s (PEO), poly(propylene oxide)s (PPO) and their copolymers. Molecular mass of over 2000, preferably over 3000;
  Polyethers, N-substituted amides (such as N-methylpyrrolidone, dimethylformamide or isopropylacrylamide);
  Dispersing agents such as polynaphthalene sulphonates (PNS) or polymelamine sulphonates (PMS).

The fluids of the invention can also comprise other additives or agents to endow them with other properties, for example pH buffers or any other additive required to carry out a specific treatment. These fluids are more particularly and advantageously used as a flushing fluid for recovering secondary hydrocarbons. A further advantageous application is in treating a matrix by injecting solutions from a production well into reservoir rock, the rheo-viscosifying behaviour enabling viscosity to be obtained by shear which is higher than the viscosity of the fluid to be displaced, thus preventing fingering effects which occur with newtonian fluids, and more so with rheo-fluidifying fluids, when the injected fluid is less viscous than the displaced fluid.

The fluids of the invention can also be used to position temporary plugs, either in a porous rock or in a cylindrical space with an approximately circular or annular cross section. In this case, its reversible nature enables the fluid to be liquefied to be unblocked, without leaving damage behind, i.e. without reducing the permeability of the porous rock, which damage requires difficult and expensive treatments to remove it, if it is indeed capable of being removed.

One example of use is thus for temporary protection of a reservoir rock against the harmful action of another fluid which would damage it, or temporarily blocking a portion of the zone of the reservoir at the margin of a well to facilitate injection of a treatment fluid into the non blocked zone to eliminate damage, for example, or to reverse wetting of the reservoir rock (hydrophilic wetting/oleophilic wetting) in one direction or the other, depending on the required effect on the hydrocarbon flow. This type of intervention is termed diversion. On shearing the fluid in the open well, in the tubing, casing, or the annular space, a temporary plug can be created which can, inter alia, act to deposit a specific plug of cement on its surface. It is also possible to temporarily plug extremely permeable or highly fractured zones (thief zones) in a reservoir where drilling mud or cement are swallowed up, creating circulation loss. These fluids can also act to fracture reservoirs to increase the production output of a field by including them in the initial portion of the fracturing fluid (pre-pad) and/or in the main portion of that fluid, intended to prop the walls of the fracture apart.

Different formulations of fluid have been tested which all correspond to a water-based fluid ready for use.

For these tests, commercially available precipitated silica suspensions sold by HOECHST under the trade name KLEBESOL 30R25 and KLEBESOL 30R9 were used. The silicas were systematically washed in an ultrafiltration cell to prevent side effects due mainly to the presence of surfactants. The products had the following characteristics:

|  | KLEBOSOL 30R25 | KLEBOSOL 30R9 |
| --- | --- | --- |
| particle size (range in nm) | 11.5 | 4.5 |
| concentration in suspension (g/l) | 255.5 | 232.3 |
| pH | 8.32 | 8.36 |
| conductivity (mS/cm) | 0.66 | 1.34 |
| specific surface area (m$^2$/g) | 120 | 300 |

The quantities of silica given below are all given relative to the mass of precipitated silica in the final aqueous solution.

It should be noted that systems prepared with Aerosil silicas such as Aerosil 380 hydrophilic silica sold by DEGUSSA CO, with a specific surface area of 380±30 m$^2$/g and a diameter of 7 nm, did not exhibit any rheo-viscosifying phenomenon.

Copolymers with the physico-chemical characteristics given in the Table below were prepared using a radical route. After weighing out the various monomers in the desired proportions, the desired quantity of water was introduced into the reactor with stirring. After ½ an hour in a stream of nitrogen, an initiator (ABAH, molecular mass 270.9 g/mol, sold by HOECHST) was introduced: the smaller the quantity, the higher the molecular mass. After 4 hours at 60° C., with stirring and in a stream of nitrogen, the copolymer was precipitated in absolute ethanol and vacuum dried.

| Copolymer type: | PAA80/ PVP20 | PAA90/ PVP10 | PAA95/ PVP5 | PAA80/ PVI20 | PAA90/ PVI10 | PAA95/ PVI5 |
|---|---|---|---|---|---|---|
| % of co-monomers (as analysed) | 20 | 10.7 | 5.1 | 20.35 | 10.4 | 5.8 |
| mass av mol wt | $2.6 \times 10^6$ | $3 \times 10^6$ | $1.2 \times 10^6$ | $1.35 \times 10^6$ | $2.7 \times 10^6$ | $1.6 \times 10^6$ |
| polydispersity index | 6.7 | 6 | 7.6 | 3.3 | 4.15 | 3.4 |

EXAMPLE 1

PAA95/PVP5 type copolymer ($Q=0.66$ mg/m$^2$ of polymer per m$^2$ of silica surface) was added to an aqueous solution comprising 42.5 g/l of 30R25 silica. At pH=8.7, the viscosity of the solution increased from 3.8 mPa·s at rest to 21 mPa·s with a minimum critical shear rate of 1600 s$^{-1}$.

EXAMPLE 2

PAA95/PVP15 type copolymer ($Q=0.5$ mg/m$^2$) was added to an aqueous solution comprising 42.5 g/l of 30R25 silica. At the preparation pH (8.7), the system appeared to gel at the start or at least to gel at the slightest shear rate. The pH could be varied up to 10.8.

| pH | 9.3 | 9.6 | 10.8 |
|---|---|---|---|
| viscosity at rest (mPa.s) | 250 | 90 | 3 |
| viscosity after shear (mPa.s) | 2000 | 700 | 120 |
| minimum critical shear rate (s$^{-1}$) | 6 | 15 | 130 |

On increasing the pH, the initial viscosity and the gelling effect decreased substantially and the critical shear rate moved to higher values.

EXAMPLE 3

A PAA90/PVI10 type copolymer ($Q=0.6$ mg/m$^2$) was added to an aqueous solution comprising 16 g/l of 30R9 silica. The pH was varied between 7.2 and 10.3. For a pH of 9.1 or less, the solution gelled at the slightest shear rate. An increase in pH was observed to regulate this phenomenon.

| pH | 9.8 | 10 | 10.2 | 10.3 |
|---|---|---|---|---|
| viscosity at rest (mPa.s) | 23 | 4.3 | 3.3 | 3.2 |
| viscosity after shear (mPa.s) | 245 | 49 | 20 | 21 |
| minimum critical shear rate (s$^{-1}$) | 63 | 400 | 630 | 794 |

EXAMPLE 4

A PAA95/PVP type copolymer was added to an aqueous solution comprising 42.5 g/l of 30R25 silica. The pH was 8.2. The ratio Q was varied.

| Q (mg/m$^2$) | 0.5 | 0.6 | 0.8 | 1 | 1.2 |
|---|---|---|---|---|---|
| viscosity at rest (mPa.s) | 3.2 | 6.3 | 7.3 | 42 | 140 |
| viscosity after shear (mPa.s) | 12 | 36 | 80 | 230 | 430 |
| minimum critical shear rate (s$^{-1}$) | 2800 | 1250 | 750 | 100 | 25 |

EXAMPLE 5

A PAA95/PVP5 type copolymer ($Q=0.8$ mg/m$^2$) was added to an aqueous solution comprising 16 g/l of 30R9 silica. The pH was 8.5. The viscosity of the solution was 3.7 mPa·s at rest and the system gelled at 2000 s$^{-1}$.

EXAMPLE 6

A PAA95/PVP5 type copolymer ($Q=0.84$ mg/m$^2$) was added to an aqueous solution comprising 42.5 g/l of 30R25 silica. At 20° C., the viscosity of the solution was 10.3 MPa·s at rest and increased to 120 mPa·s with a minimum critical shear rate of 300 s$^{-1}$.

EXAMPLE 7

A system was prepared comprising 16 g/l of 30R9 silica and 3.905 g/l of PAA90/PVI10 type copolymer (i.e., $Q=0.8$ mg/m$^2$). The pH was 8.6. With no competing agent, the solution formed a gel at rest and behaved as a hard gel under shear. Different quantities of a competing agent were added, in the present case a non-charged surfactant, Triton X100 (alkylphenylethyleneglycol from FLUKA, average mass 646 g/mol and density $d^{20}_4=1.065$ g/cm$^3$).

| % volume Triton X100 | 0.25 | 0.5 | 0.75 | 1 |
|---|---|---|---|---|
| viscosity at rest (mPa.s) | 144 | 73 | 37 | 16 |
| viscosity after shear (mPa.s) | 727 | 703 | 152 | 19 |
| minimum critical shear rate (s$^{-1}$) | 7 | 16 | 50 | 100 |

With an addition of 1% of Triton X100, there was no more viscosification.

Adding a non-charged surfactant as a competing agent caused passage from a permanent gel state to a rheo-viscosifying state. This effect was optimized for Triton percentages in the range 0.25 to 0.75.

EXAMPLE 8

The test of Example 7 was repeated using a system constituted by an aqueous solution comprising 16 g/l of 30R9 silica and 7.8325 g/l of a copolymer of type PAA80/PVI20 ($Q=1.6$ mg/m$^2$). The pH was 8.4. The competing agent was Triton X100.

With no competing agent, or with at most 0.1 % by volume (i.e., 1.06 g/l), there was no viscosification or gel formation (the system was non-rheothickening due to too great an affinity of the polymer for the silica).

| % volume Triton X100 | 0.25 | 0.5 | 0.75 |
|---|---|---|---|
| viscosity at rest (mPa.s) | 3.5 | 5.7 | 5.7 |
| viscosity after shear (mPa.s) | 17.8 | 26 | 7.41 |
| minimum critical shear rate (s$^{-1}$) | 2775 | 1123 | 560 |

It could be seen that with 0.75% addition, there was no more viscosification.

EXAMPLE 9

Solutions comprising 42.5 g/l of 30R25 silica and 3.6 g/l of a PAA95/PVP5 type copolymer (Q=0.7 mg/m$^2$) were prepared. In this case, the operating procedure consisted of varying the ionic strength ΔI on the polymer solution and adding the silica suspension to prevent aggregation of the silica particles in the suspension.

| ΔI(mol/l) | 0 | 10$^{-3}$ | 5 10$^{-3}$ | 10$^{-2}$ |
|---|---|---|---|---|
| viscosity at rest (mPa.s) | 4.6 | 4 | 3.5 | 3.5 |
| viscosity after shear (mPa.s) | 45 | 30 | 27 | 22 |
| minimum critical shear rate (s$^{-1}$) | 1430 | 1630 | 1110 | 690 |

EXAMPLE 10

A PAA95/PVI5-30R25 silica system was prepared. The concentrations of silica and polymer were respectively 42.5 g/l and 1.795 g/l (Q=0.35 mg/m$^2$). The pH was 8.4.

The time required—gel time—for the viscosification effect to appear was measured.

| minimum critical shear rate (s$^{-1}$) | 1300 | 800 | 700 | 650 | 625 | 600 |
|---|---|---|---|---|---|---|
| gel time(s) | 3 | 10 | 14 | 39 | 84 | 171 |

After shear stressing, a rate of 10 s$^{-1}$ was applied for more than half an hour, and since the viscosity did not reduce it showed that, after stressing, the viscosifying effect could be maintained using a very low rate while remaining reversible.

EXAMPLE 11

The test was carried out on the same system PAA90/PVI10, 3.8825 g/l and 30R9 silica (16 g/l) [Q=0.8 mg] as for Example 7, replacing the competing agent N-methylpyrrolidone NMP,

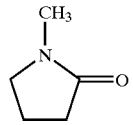

with purity of 99.5% (mass 99 g/mol, density d$^{20}_4$=1.0279 g/cm$^3$).

The pH was 8.6 and the conductivity was 178 μS/cm.

NMP had the same influence on Theological behaviour as TRITON X100: an increase in the critical shear rate and a reduction in the viscosifying effect with an increase in the percentage of competing agent.

EXAMPLE 12

The preceding test was repeated, adding a polyvinylpyrrolidone (PVP) type polymer, with a molar mass of 10000 g/mol sold by FLUKA (K15), as the competing agent. The pH was 8.8 and the conductivity was 186 μS/cm.

PVP acted as a competing agent but is less preferred because of the small variations in the viscosifying effect and the inhomogeneities due to the copolymer-PVP mixture.

EXAMPLE 13

A PAA90/PVI10 3.8825 g/l and 30R9 silica (16 g/l) [Q=0.8 mg] system was again used. The competing agent was polyethylene glycol (PEG or poly(ethylene oxide) PEO) with a molecular mass of 400 g/mol and a density d$^{20}_4$=1.13 g/cm$^3$. The pH was 8.3 and the conductivity was 230 μS/cm.

| % volume of PEG$_{400}$ | 1 | 1.5 | 1.75 | 2.5 |
|---|---|---|---|---|
| viscosity at rest (mPa.s) | 404 | 55 | 26 | 7.7 |
| viscosity after shear (mPa.s) | 3060 | 860 | 395 | 81 |
| minimum critical shear rate (s$^{-1}$) | 9.3 | 41 | 75 | 563 |

EXAMPLE 14

The preceding test was repeated, this time using a polyethylene glycol with a higher mass (7500 g/mol). The pH was 8.3 and the conductivity was 230 μS/cm.

| % volume of PEG$_{7500}$ | 0.01 | 0.03 | 0.05 |
|---|---|---|---|
| viscosity at rest (mPa.s) | 800 | 254 | 21 |
| viscosity after shear (mPa.s) | 3000 | 2855 | 347 |
| minimum critical shear rate (s$^{-1}$) | 5 | 21 | 110 |

EXAMPLE 15

A PAA90/PVI10 3.8825 g/l and 30R9 silica (16 g/l) [Q=0.8 mg] system was again used. The competing agent was a 50:50 ethylene glycol/propylene glycol copolymer, PEO-PPO, with mass 4800 g/mol (B11/700, HOECHST). The pH was 9.07 and the conductivity was 160 μS/cm.

| % volume NMP | 3 | 4 | 4.25 | 4.75 | 5 | 7 | 8 |
|---|---|---|---|---|---|---|---|
| viscosity at rest (mPa · s) | 107 | 45 | 12.5 | 12.4 | 11.1 | 7.9 | 8.2 |
| viscosity after shear (mPa · s) | 663 | 400 | 111 | 127 | 88 | 24.2 | 17.8 |
| minimum critical shear rate (s$^{-1}$) | 60 | 69 | 275 | 315 | 310 | 671 | 750 |

| % mass of PEO-PPO | 0.01 | 0.025 | 0.05 | 0.2 |
|---|---|---|---|---|
| viscosity at rest (mPa.s) | 800 | 74 | 11 | 16 |
| viscosity after shear (mPa.s) | 3170 | 606 | 205 | 26 |
| minimum critical shear rate (s$^{-1}$) | 8 | 88 | 164 | 415 |

This Example shows that the viscosification property passes through a maximum on addition of the competing agent.

EXAMPLE 16

A PAA90/PVI10 3.8825 g/l and 30R9 silica (16 g/l) [Q=0.8 mg] system was again used. Different types of fatty alcohols sold by HOECHST with the following characteristics were added as the competing agent

| Commercial name of product | Génapol 2822 | Génapol 3938 | Génapol 2908D |
|---|---|---|---|
| Carbon chains | C10/C12 | C12/C14 | C12/C15 |
| Cloud point (1% aqueous solution) | 3 ± 1 | 45 ± 1 | 30 ± 1 |
| Viscosity at 20° C. (mPa) | 50 | 80 | 60–80 |

| Type of fatty alcohol | Génapol 2822 | Génapol 3938 | Génapol 2908D |
|---|---|---|---|
| pH | 9.1 | 9.2 | 9.1 |
| conductivity (µS/cm) | 159 | 195 | 200 |
| % mass of fatty alcohol | 0.75 | 0.6 | 0.6 |
| viscosity at rest (mPa.s) | 18 | 93 | 60 |
| viscosity after shear (mPa.s) | 256 | 1350 | 894 |
| minimum critical shear rate (s$^{-1}$) | 145 | 27 | 48 |

EXAMPLE 17

A static shear rate flushing test was carried out on the PAA90/PVI10 3.8825 g/l and 30R9 silica (16 g/l) [Q=0.8 mg] system: flushing of 0 to 10 s$^{-1}$ in 2000 s then back. The curve obtained is shown in FIG. 1 (with the shear rate $\dot{\gamma}$ (in s$^{-1}$) as a logarithmic scale along the abscissa and the viscosity η (in Pa·s), also as a logarithmic scale, up the ordinate. It can be seen that the rheo-viscosifying effect is perfectly reversible.

The above examples underline the principal advantages of the invention:

Complete reversibility of rheo-viscosifying/gelling;

The possibility of removing or activating the rheo-viscosifying/gelling effect by varying the pH. When the pH is over 9.5/10, the fluid behaviour becomes purely newtonian, allowing the fluid to be pumped. On adjusting the pH in situ at the desired moment by reducing the pH to 8.5, the rheo-viscosifying/gelling function is activated. In situ pH adjustment can be carried out using means which are well known in the art, such as using a product which decomposes with time and temperature to liberate H$^+$ ions, using an acid or a pH buffer at close to 8.5 encapsulated in a shell, which dissolves or is destroyed at a given temperature or which is destroyed on shearing.

Good resistance to an increase in the ionic force of the medium, intentionally by addition of ions or accidentally by dissolution of salts in geological formations or by contamination by subterranean waters.

Possible adjustment of a base mixture (same polymer and same silica) to the desired level of rheological characteristics by adding a competing agent.

Possible rheopexy by judicious choice of polymer composition, and its proportion and the quantity of silica.

Possibility of preserving a gel at very low shear rate after having formed it at a higher shear rate, above the critical shear rate (minimum shear rate for producing viscosification).

Reduced cost of high molecular mass polymer.

What is claimed is:

1. A water-based fluid with a viscosity which is controlled by a system constituted by precipitated silica nanoparticles having a diameter less than 70 nanometers associated with a water-soluble copolymer of the type monomer $I_{(I-x)}$ monomer $II_{(x)}$ with a molecular mass of over 700,000 g/mol wherein monomer I is acrylamide, monomer II is selected from the group consisting of vinylpyrrolidone and vinylimidazole, and x is in the range 0.05 to 0.2.

2. A fluid as claimed in claim 1, wherein the water-soluble copolymer has a molecular mass greater than about 1,000,000 g/mol.

3. A fluid as claimed in claim 2, wherein the water-soluble copolymer has a molecular mass greater than about 2,000,000 g/mol.

4. A fluid as claimed in claim 1, wherein the diameter of the silica nanoparticles is less than 10 nanometers.

5. A fluid as claimed in claim 1, wherein the concentration of copolymer is in the range 0.5 gl to 10 g/l.

6. A fluid as claimed in claim 1, wherein the number of grams of copolymer per square meter of silica surface is in the range 0.1 mg/m$^2$ to 2 mg/m$^2$.

7. A fluid as claimed in claim 6, wherein the number of grams of copolymer per square meter of silica surface is in the range 0.2 mg/m$^2$ to 1.5 mg/m$^2$.

8. A fluid as claimed in claim 1, further comprising at least one competing agent selected from the group consisting of:

fatty alcohol non ionic surfactants;

polyethers;

N-substituted amides; and dispersing agents.

9. A water-based fluid with a viscosity which is controlled by a system constituted by precipitated silica nanoparticles having a diameter less than 70 nanometers associated with i) a water-soluble copolymer with a molecular mass of over 700,000 g/mol formed by at least 50% of at least one water-soluble comonomer (I) selected from the group consisting of
acrylamide,
acrylic acid,
methacrylic acid,
acrylic acid derivatives with an alkyl group in the β position,
2-acrylamido-2-methylpropanesulphonate, and
sulphonated styrene;

and the remainder being formed by at least one water-soluble co-monomer (II) selected from the group consisting of vinylpyrrolidone,
vinylimidazole (pH>6),
vinylpyridine,
alkylvinylethers,
N-vinylacetamide,
hydroxyethylmethacrylate and
alkyl derivatives of these compounds;
and
  ii) at least one competing agent selected from the group consisting of
    fatty alcohol non ionic surfactants;
    polyethers;
    N-substituted amides; and
    dispersing agents.

10. A fluid as claimed in claim 9, wherein the water-soluble copolymer has a molecular mass greater than about 1,000,000 g/mol.

11. A fluid as claimed in claim 10, wherein the water-soluble copolymer has a molecular mass greater than about 2,000,000 g/mol.

12. A fluid as claimed in claim 9, wherein the diameter of the silica nanoparticles is less than 10 nanometers.

13. A fluid as claimed in claim 9, wherein the concentration of copolymer is in the range 0.5 g/l to 10 g/l.

14. A fluid as claimed in claim 9, wherein the number of grams of copolymer per square meter of silica surface is in the range 0.1 mg/m$^2$ to 2 mg/m$^2$.

15. A fluid as claimed in claim 14, wherein the number of grams of copolymer per square meter of silica surface is in the range 0.2 mg/m$^2$ to 1.5 mg/m$^2$.

16. The fluid of claim 8, wherein said polyether is selected from the group consisting of poly(ethylene oxides)s, poly(propylene oxide)s and copolymers thereof with a molecular mass of over 2000.

17. The fluid of claim 8, wherein said polyether is selected from the group consisting of poly(ethylene oxides)s, poly(propylene oxide)s and copolymers thereof with a molecular mass of over 3000.

18. The fluid of claim 8, wherein said N-substituted amide is selected from the group consisting of N-methylpyrrolidone, dimethylformamide and isopropylacrylamide.

19. The fluid of claim 9, wherein said polyether is selected from the group consisting of poly(ethylene oxides)s, poly(propylene oxide)s and copolymers thereof with a molecular mass of over 2000.

20. The fluid of claim 9, wherein said polyether is selected from the group consisting of poly(ethylene oxides)s, poly(propylene oxide)s and copolymers thereof with a molecular mass of over 3000.

21. The fluid of claim 9, wherein said N-substituted amide is selected from the group consisting of N-methylpyrrolidone, dimethylformamide and isopropylacrylamide.

* * * * *